United States Patent
Choe et al.

(10) Patent No.: US 8,252,367 B2
(45) Date of Patent: Aug. 28, 2012

(54) METHODS AND APPARATUS TO FABRICATE SOFT MAGNETIC FILM WITH PREFERRED UNIAXIAL ANISOTROPY FOR PERPENDICULAR RECORDING

(75) Inventors: Gunn Choe, San Jose, CA (US);
Yoshihiro Ikeda, San Jose, CA (US);
Masayoshi Shimizu, Tokyo (JP);
Kiwamu Tanahashi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1166 days.

(21) Appl. No.: 11/960,006

(22) Filed: Dec. 19, 2007

(65) Prior Publication Data

US 2009/0162573 A1    Jun. 25, 2009

(51) Int. Cl.
*G11B 5/66* (2006.01)
*H05B 6/00* (2006.01)

(52) U.S. Cl. ........ 427/131; 427/130; 427/599; 428/827; 428/828; 428/828.1

(58) Field of Classification Search ................. 427/599, 427/130–131
See application file for complete search history.

(56) References Cited

U.S. PATENT DOCUMENTS

| | | | |
|---|---|---|---|
| 4,103,315 A * | 7/1978 | Hempstead et al. | 360/110 |
| 5,665,465 A * | 9/1997 | Gyorgy et al. | 428/328 |
| 6,105,237 A * | 8/2000 | Gill | 29/603.08 |
| 6,391,483 B1 * | 5/2002 | Zhu et al. | 428/810 |
| 6,395,413 B1 * | 5/2002 | Ando | 428/830 |
| 6,667,118 B1 | 12/2003 | Chang et al. | |
| 6,819,533 B2 | 11/2004 | Noma et al. | |
| 7,106,539 B2 | 9/2006 | Aoyagi et al. | |
| 7,153,596 B2 | 12/2006 | Tanahashi et al. | |
| 7,378,164 B1 * | 5/2008 | Lairson et al. | 428/828.1 |
| 2002/0028357 A1 * | 3/2002 | Shukh et al. | 428/694 TM |
| 2002/0131219 A1 * | 9/2002 | Mack et al. | 360/324.12 |
| 2002/0197514 A1 * | 12/2002 | Tanahashi et al. | 428/694 TM |
| 2004/0067391 A1 * | 4/2004 | Hong et al. | 428/694 BP |
| 2004/0233565 A1 * | 11/2004 | Arai et al. | 360/66 |
| 2004/0234818 A1 * | 11/2004 | Tanahashi et al. | 428/694 TM |
| 2005/0008902 A1 * | 1/2005 | Bertero et al. | 428/694 TM |
| 2005/0117247 A1 * | 6/2005 | Aoyagi | 360/97.01 |
| 2005/0225907 A1 | 10/2005 | Hoshiya et al. | |
| 2005/0244679 A1 * | 11/2005 | Arai et al. | 428/828 |
| 2006/0001996 A1 | 1/2006 | Aoyagi et al. | |
| 2006/0164759 A1 * | 7/2006 | Okada et al. | 360/126 |
| 2007/0003795 A1 | 1/2007 | Oh et al. | |
| 2009/0257147 A1 * | 10/2009 | Ajan | 360/125.02 |

* cited by examiner

*Primary Examiner* — Timothy Meeks
*Assistant Examiner* — Mandy Louie

(57) ABSTRACT

Soft magnetic film fabricated with preferred uniaxial anisotropy for perpendicular recording. One type of cathode design has a field direction that is parallel to the direction of the Hex of the second SUL with a magnetically-pinned first SUL. In addition, SUL structures having low AP exchange energy also are disclosed. The SUL structure combines the cathode field direction of the SUL2 with the pinned SUL1. The SUL1 is magnetically pinned to the pinning layer and the pinning direction is parallel to the direction of the cathode field applied during deposition of the SUL1. High Hc ferro-magnetic materials may be deposited onto a heated substrate that is magnetized along the radial direction by the cathode field. The pinning field may be higher than the cathode field, indicating that the cathode field during deposition of the SUL2 cannot disturb the magnetic state of the SUL1 pinned to pinning layer.

22 Claims, 5 Drawing Sheets

METHODS AND APPARATUS TO FABRICATE SOFT MAGNETIC FILM WITH PREFERRED UNIAXIAL ANISOTROPY FOR PERPENDICULAR RECORDING

BACKGROUND OF THE INVENTION

1. Technical Field

The present invention relates in general to perpendicular recording media for hard disk drives and, in particular, to an improved system, method, and apparatus for fabricating soft magnetic film with preferred uniaxial anisotropy for perpendicular recording.

2. Description of the Related Art

In perpendicular recording media, the soft magnetic underlayer (SUL) film gets thinner as the write pole head gets smaller with increasing areal density. An anti-parallel (AP) coupled SUL structure (e.g., two SULs separated by an Ru spacer) is widely used in disk drives because of its remnant state of cancelled magnetic moments between the two SULs. Uniaxial anisotropy of the SUL is induced by a radial cathode magnetic field during sputter deposition. The cathode field strength should be higher than the AP exchange field, Hex, in order to induce radial anisotropy.

As for the second SUL deposited onto the Ru spacer, the initial deposited layer experiences a very high AP exchange field having a direction opposite to the cathode field direction. Moreover, its anisotropy direction (i.e., the magnetic easy axis) can be tilted out of the radial direction or rotated into a circumferential direction if the Hex is strong enough to exceed the radial cathode field. As the layer gets thicker, the Hex decreases sharply and then the cathode field can readily overcome the Hex to align the anisotropy to the radial direction. Inducing radial anisotropy in an AP-coupled SUL becomes an issue as the SUL thickness decreases.

As shown in FIG. 1, for a SUL (Bs=1.2 T) thickness below about 12 nm, the Hex 11 is higher than the cathode field (e.g., about 60 Oe), which makes it difficult to align the radial anisotropy of the top SUL. In this case, the dispersion of the second SUL anisotropy is observed due to interference between the cathode field and the Hex. However, as a result of this, the saturation field 21 (FIG. 2) of the SUL in the circumferential direction is reduced. Thus, an improved solution for fabricating soft magnetic film with preferred uniaxial anisotropy for perpendicular recording would be desirable.

SUMMARY OF THE INVENTION

Embodiments of a system, method, and apparatus for fabricating AP-coupled SUL film with good radial anisotropy are disclosed. For example, one type of cathode design has a field direction that is parallel to the direction of the Hex of the second SUL with a magnetically-pinned first SUL. In addition, an SUL structure having a low AP exchange energy also is disclosed.

In one embodiment, the SUL structure combines the cathode field direction of the SUL2 with the pinned SUL1. The SUL1 is magnetically pinned to the pinning layer and the pinning direction is parallel to the direction of the cathode field applied during deposition of the SUL1. High Hc ferromagnetic materials may be deposited onto a heated substrate that is magnetized along the radial direction by the cathode field. For an SUL thickness below 18 nm, the pinning field is higher than the cathode field, indicating that the cathode field during deposition of the SUL2 cannot disturb the magnetic state of the SUL1 pinned to pinning layer.

The cathode field direction of the SUL2 may be opposite to the cathode field direction of the SUL1. With this method, the cathode field direction is in the same direction as the AP exchange field. Applying Hex to the SUL2 results in strong uniaxial anisotropy along the radial direction during deposition of the SUL2 layer.

In another embodiment, an SUL structure reduces the AP exchange energy, Jex which results in lower Hex. With lower Jex, the Hex over a wide range of SUL thicknesses is decreased, resulting in the condition, H(cathode)>Hex, even at SUL thicknesses below 10 nm. The Hex may be significantly reduced, leading to the required condition, H(cathode)>Hex. By controlling Ru thickness at different SUL thickness, the Hex can be adjusted to satisfy the condition of H(cathode)>Hex.

In another embodiment, Jex is reduced to change and optimize the magnetization (Bs) of the SUL. Because of the interfacial nature of Jex, lower Bs of the SUL results in lower Jex. The Hex as well as Jex can be reduced by a factor of 2 as Bs changes from 1.2 T to 0.8 T. A low-Bs SUL can shift down the Hex at every SUL thickness level, which leads to the condition: H(cathode)>Hex. Moreover, by employing a low-Bs SUL only at the Ru interface (which reduces Jex but with a majority of high-Bs SUL in the SUL structure), average magnetization of the SUL can be maintained at a high level, but the Hex can be reduced to meet the requirement: H(cathode)>Hex. In this composite SUL structure, low-Bs at the Ru interface may be in the range of 0.3 to 0.8 T, and high-Bs may be in the range of 1.0 to 2.4 T.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
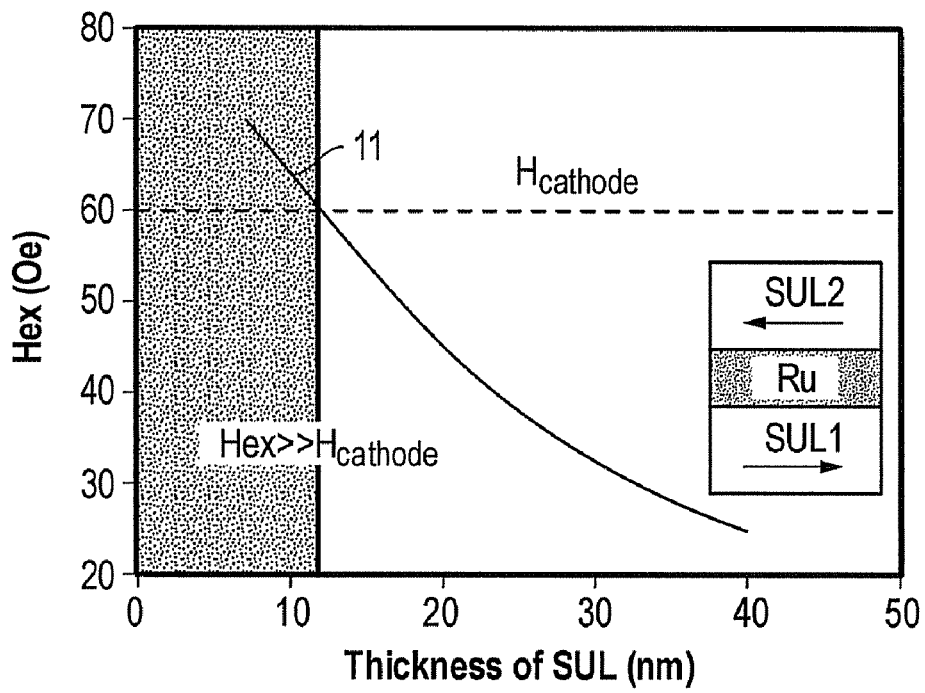
FIG. 1 is a plot of the exchange field performance of a conventional soft underlayer (SUL) structure.
Figure 2:
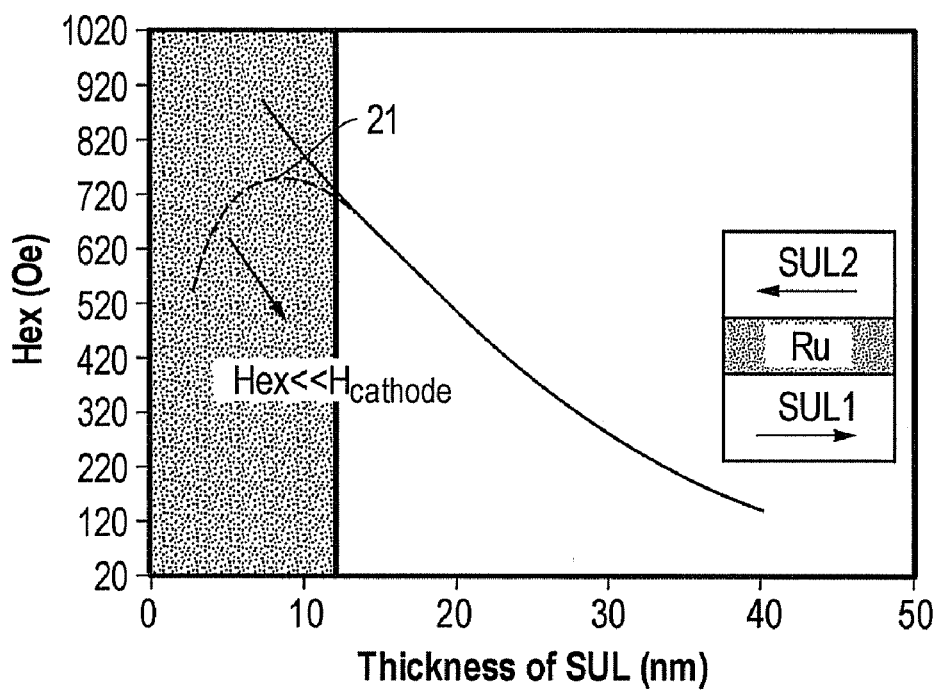
FIG. 2 is a plot of the saturation field performance of the SUL structure of FIG. 1.

Referring to FIGS. 3-10, embodiments of a system, method and apparatus for fabricating anti-parallel (AP) coupled soft magnetic underlayer (SUL) film with good radial (e.g., preferred uniaxial) anisotropy are disclosed. The invention is particularly well suited for applications at SUL thicknesses below 15 nm. For example, one type of cathode design has a field direction that is parallel to the direction of the Hex of the second SUL with a magnetically-pinned first SUL. In addition, a SUL structure having a low AP exchange energy also is disclosed.

In one embodiment (FIG. 3), the SUL structure 31 combines the cathode field direction 33 of the SUL2 with the pinned SUL1. The SUL1 is magnetically pinned to the pinning layer 35 and the pinning direction 37 is parallel to the direction of the cathode field 39 applied during deposition of the SUL1. The pinning layer 35 may be formed from, for example, CoPt, CoPtCr, CoPtCrTa, CoPtCrB, etc., with high coercivity, Hc. For example, the pinning layer may be provided with a coercivity in a range of 1 kOe to 5 kOe. The high Hc ferro-magnetic materials may be deposited onto a heated substrate that is magnetized along the radial direction by the cathode field 39.

Figure 4:
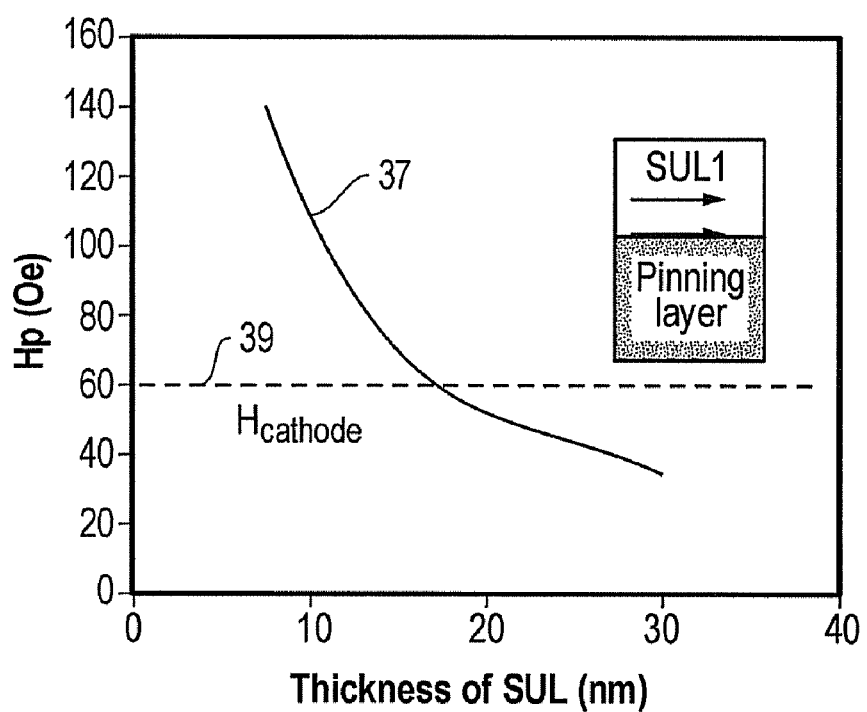
FIG. 4 is a plot of the pinning field performance of the SUL structure of FIG. 3 as a function of SUL thickness.
Figure 5:
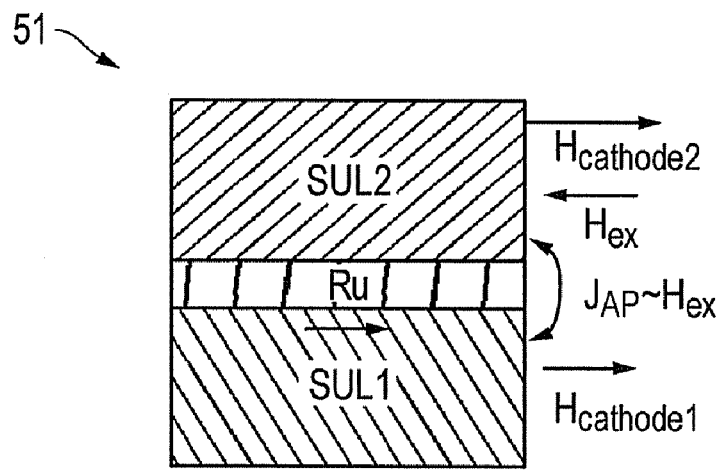
FIG. 5 is a schematic sectional side view of another embodiment of a SUL structure constructed in accordance with the invention.

Referring now to FIG. 4, the pinning field 37 as a function of SUL thickness (e.g., Bs=1.2 T) is shown. For an SUL thickness below 18 nm, the pinning field is higher than the cathode field 39. This indicates that the cathode field 33 during deposition of the SUL2 cannot disturb the magnetic state of the SUL1 pinned to pinning layer 35.

Figure 3:
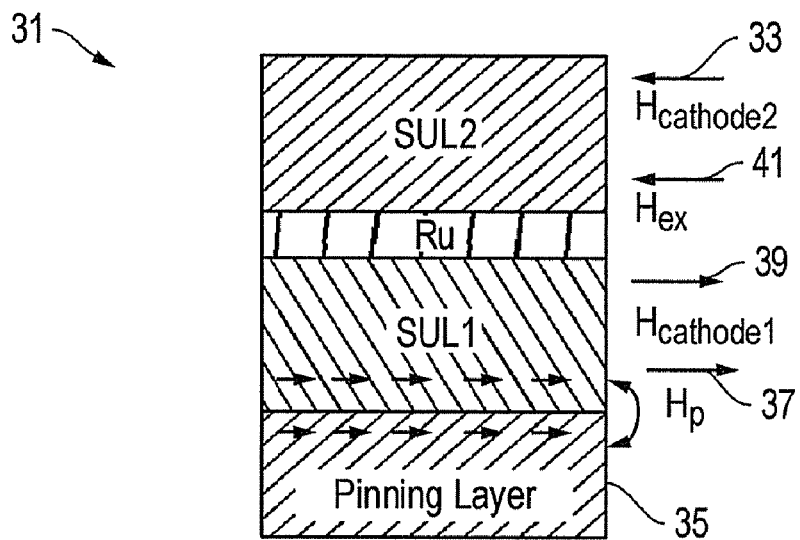
FIG. 3 is a schematic sectional side view of one embodiment of a SUL structure constructed in accordance with the invention.

As shown in FIG. 3, the cathode field direction 33 of the SUL2 may be opposite to the cathode field direction 39 of the SUL1. With this embodiment, the cathode field direction 33 is in the same direction as the AP exchange field (Hex) 41. Applying Hex 41 to the SUL2 during deposition of the SUL2 layer results in strong uniaxial anisotropy along the radial direction. The polarity of the cathode field 33 in the SUL2 station can be changed by, for example, either (1) rotating the poles of permanent magnets by 180 degrees away from those in the SUL1 station, or (2) changing the current direction of the cathode electromagnets in the SUL2 vs. SUL1 when the cathode utilizes electromagnets.

Figure 6:
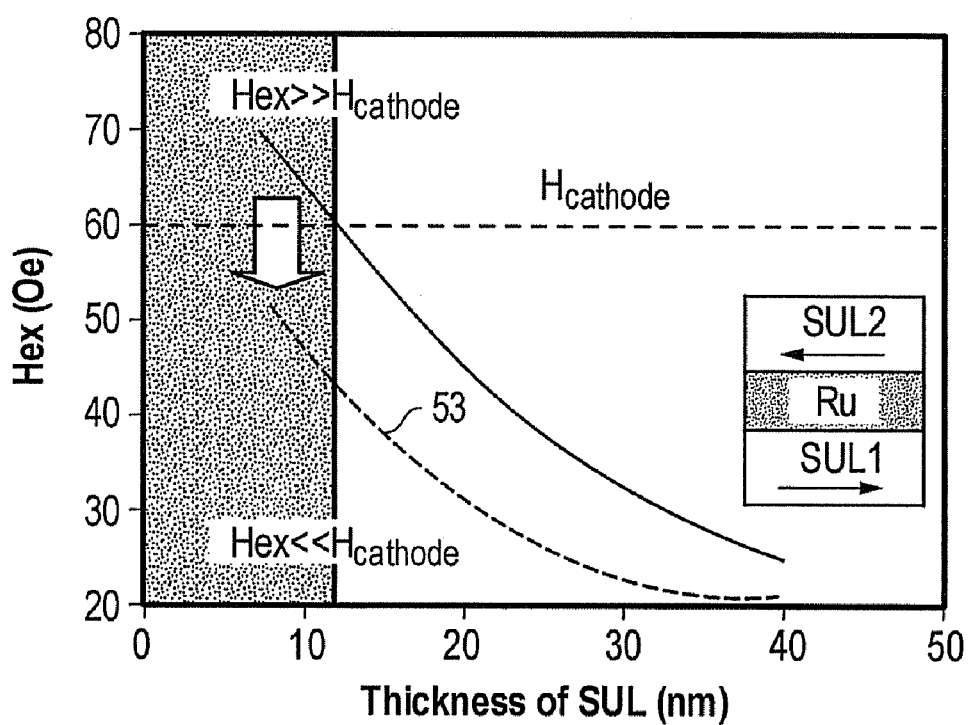
FIG. 6 is a plot of the exchange field performance of the SUL structure of FIG. 5 as a function of SUL thickness.

In another embodiment (FIG. 5), an SUL structure 51 reduces the AP exchange energy, Jex, which results in lower Hex 53 (FIG. 6). For example, the SUL structure may be provided with an AP exchange energy in a range of 0.01 to 0.20 erg/cm$^2$. With lower Jex, the Hex over a wide range of SUL thicknesses is decreased, resulting in the condition, H(cathode)>Hex, even at SUL thicknesses below 10 nm.

Figure 7:
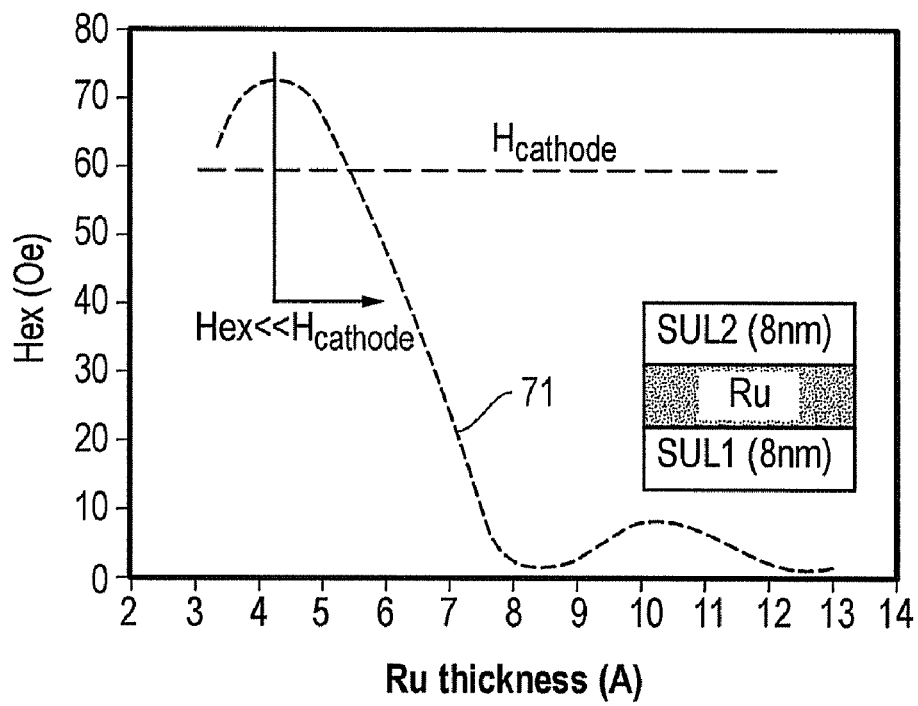
FIG. 7 is a plot of the performance of another embodiment of a SUL structure constructed in accordance with the invention.
Figure 8:
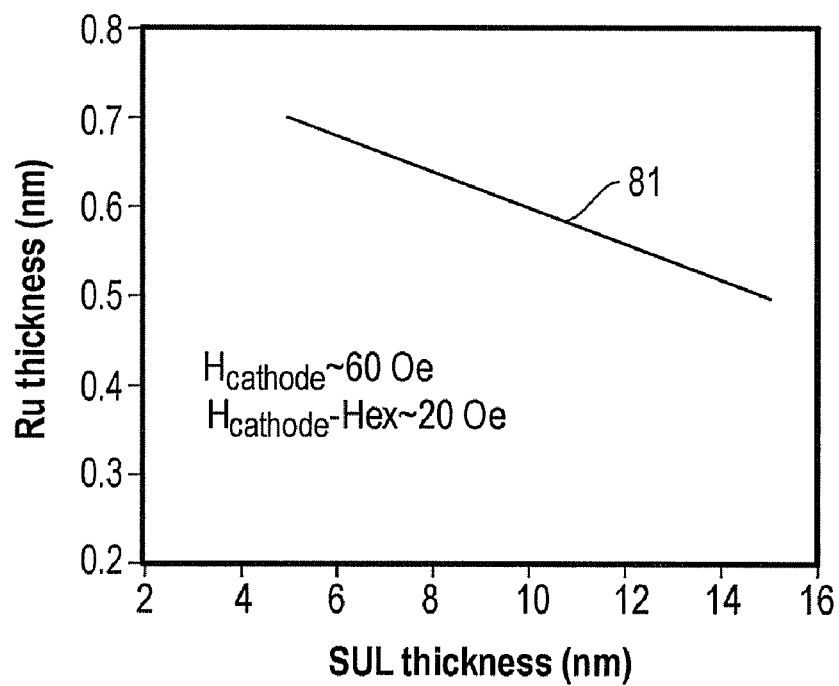
FIG. 8 is a plot of performance for SUL structures having different thicknesses constructed in accordance with the invention.

For example, the Jex may be reduced by one of two methods: (1) increasing Ru spacer thickness, or (2) decreasing magnetization (Bs) of the SUL. In addition, the Jex may be provided in a range of 0.01 to 0.1 erg/cm$^2$. The change 71 in Hex with Ru spacer thickness is shown in FIG. 7 for SUL layers (e.g., Bs=1.2 T) for thickness of about 8 nm. By increasing Ru thickness from 0.45 nm to up to about 0.7 nm, the Hex is significantly reduced as shown, leading to the required condition, H(cathode)>Hex. By controlling Ru thickness at different SUL thicknesses, the Hex can be adjusted to satisfy the condition of H(cathode)>Hex. FIG. 8 illustrates the suggested Ru thickness 81 for different SUL thickness (e.g., Bs about 1.2 T) to meet the condition: H(cathode)>Hex by about 20 Oe.

Figure 9:
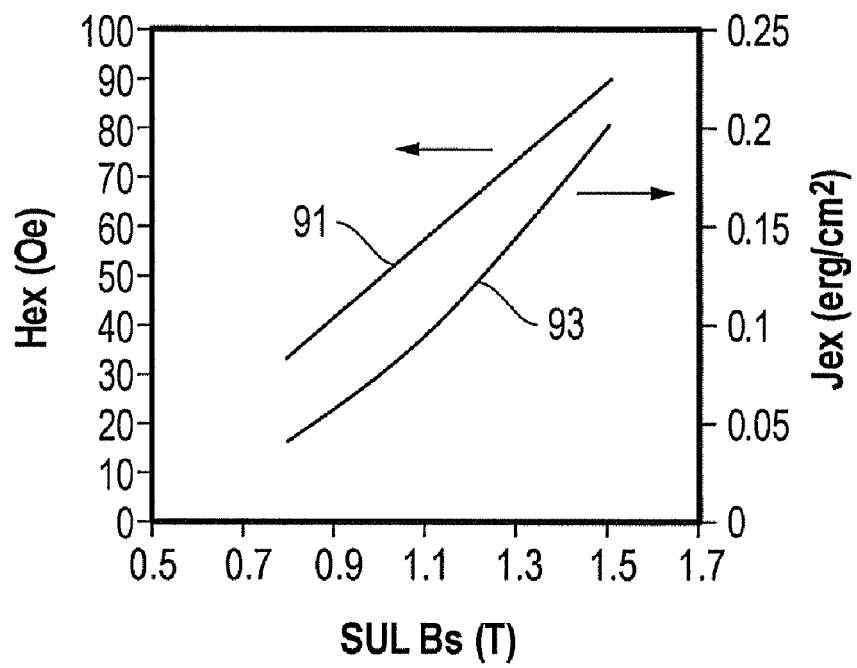
FIG. 9 is a plot of performance for another embodiment of a SUL structure constructed in accordance with the invention.
Figure 10:
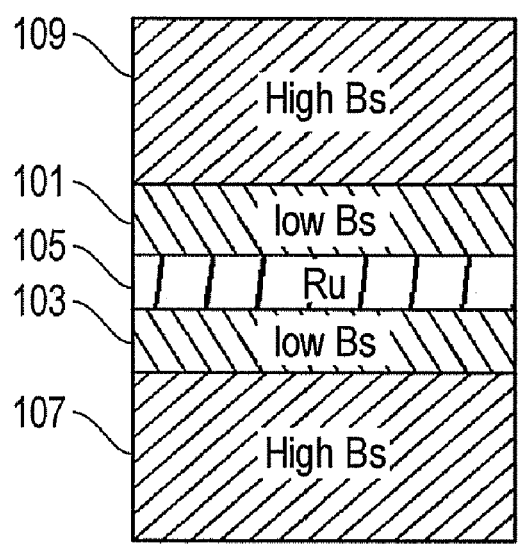
FIG. 10 is a schematic sectional side view of still another embodiment of a SUL structure constructed in accordance with the invention.

In another embodiment, Jex is reduced to decrease and optimize the magnetization (Bs) of the SUL. Because of the interfacial nature of Jex, lower Bs of the SUL results in lower Jex. As shown in FIG. 9, the Hex 91 as well as Jex 93 can be reduced by a factor of 2 as Bs changes from about 1.2 T to 0.8 T. A low-Bs SUL can shift down the Hex at every SUL thickness level, which leads to the condition: H(cathode)>Hex.

Moreover, by employing a low-Bs SUL only at the Ru interface (which reduces Jex but with a majority of high-Bs SUL in the SUL structure), average magnetization of the SUL can be maintained at a high level, but the Hex can be reduced to meet the requirement: H(cathode)>Hex. In this composite SUL structure (see, e.g., schematic example shown in FIG. 10), low-Bs layers 101, 101 at the Ru interface 105 may be in the range of 0.3 to 0.8 T, and high-Bs layers 107, 109 may be in the range of 1.0 to 2.4 T. Low-Bs materials may comprise, for example, FeCoTaZr, FeCoTaZrB, FeCoTaZrBSi, FeCoTaZrMoB, CoB, CoFeSiB, CoFeB, CoZrTa, CoZrNb, or CoZrTaNb; and high-Bs materials may comprise FeCoTaZr, FeCoB, FeCoBCr, FeCoTaB, FeCoTa, FeCoTaCr, etc.

While the invention has been shown or described in only some of its forms, it should be apparent to those skilled in the art that it is not so limited, but is susceptible to various changes without departing from the scope of the invention. For example, the invention also is suitable for magnetic media applications such as magnetic tape.

What is claimed is:

1. A method of forming a soft underlayer structure for magnetic media, comprising:
   (a) providing a pinning layer having a pinning direction;
   (b) depositing a first soft underlayer (SUL1) having a thickness of less than 15 nm on the pinning layer and applying a first cathode field to the SUL1, the first cathode field having a first direction, and magnetically pinning the SUL1 to the pinning layer, such that the pinning direction of the pinning layer is parallel to the first direction of the first cathode field applied during deposition of the SUL1;
   (c) depositing an intermediate layer having a thickness of up to about 0.7 nm on the SUL1; and
   (d) depositing a second soft underlayer (SUL2) having a thickness of less than 15 nm on the intermediate layer and applying a second cathode field to the SUL2, the second cathode field having a second direction that is opposite to the first direction, and the second direction is in a same direction as an anti-parallel exchange field (Hex) of the SUL2, to form an anti-parallel coupled soft underlayer film having uniaxial anisotropy in a radial direction.

2. A method according to claim 1, further comprising depositing the pinning layer onto a heated substrate that is magnetized along the radial direction by the first cathode field.

3. A method according to claim 1, wherein the direction of the Hex of the SUL2 is parallel to the second direction of the second cathode field.

4. A method according to claim 1, wherein the soft underlayer structure has an anti-parallel exchange energy in a range of 0.01 to 0.20 erg/cm$^2$.

5. A method according to claim 1, wherein the pinning layer has a coercivity in a range of 1 kOe to 5 kOe and is formed from a material selected from the group consisting of CoPt, CoPtCr, CoPtCrTa, and CoPtCrB.

6. A method according to claim 1, wherein the pinning layer has a pinning field that is higher than the second cathode field, such that the second cathode field applied during deposition of the SUL2 does not disturb a magnetic state of the SUL1 pinned to pinning layer.

7. A method according to claim 1, wherein step (d) comprises changing a polarity of the second cathode field by one of: (1) rotating poles of permanent magnets by 180 degrees away from those applied for the first cathode field, and (2) changing a current direction of electromagnets for the cathode fields applied to SUL1 and SUL2.

8. A method of forming a soft underlayer (SUL) structure for magnetic media, comprising:
  (a) providing the SUL structure with first and second soft underlayers (SUL1 and SUL2, respectively), SUL1 and SUL2 each having a thickness of less than 15 nm, and an intermediate layer having a thickness of up to about 0.7 nm therebetween;
  (b) applying a cathode field to the SUL structure; and
  (c) reducing an anti-parallel exchange energy (Jex) of the SUL structure to provide the SUL structure with an anti-parallel exchange field (Hex) that is lower than the cathode field by at least about 20 Oe.

9. A method according to claim 8, wherein SUL1 and SUL2 each have a thickness that is less than about 10 nm.

10. A method according to claim 8, wherein the Jex is reduced by increasing a thickness of the intermediate layer and is in a range of 0.01 to 0.1 erg/cm$^2$.

11. A method according to claim 8, wherein the Jex is reduced by decreasing magnetization (Bs) of the SUL structure and is in a range of 0.01 to 0.10 erg/cm$^2$.

12. A method according to claim 11, wherein the Bs is reduced from about 1.2 T to about 0.8 T, which reduces the Hex and Jex by a factor of about 2.

13. A method according to claim 11, wherein the Bs is about 1.2 T, and SUL1 and SUL2 each have a thickness of less than about 8 nm.

14. A method according to claim 8, further comprising providing relatively low magnetization layers only at the intermediate layer to reduce Jex, and relatively high magnetization in the SUL layers, to provide the SUL structure with a high average magnetization and reduced Hex such that the cathode field is greater than the Hex.

15. A method according to claim 14, wherein each of the relatively low magnetization layers is in a range of 0.3 to 0.8 T and located at the intermediate interface, and the SUL layers have high magnetization in a range of 1.0 to 2.4 T.

16. A method according to claim 14, wherein the relatively low magnetization layers are formed from a material selected from the group consisting of FeCoTaZr, FeCoTaZrB, FeCoTaZrBSi, FeCoTaZrMoB, CoB, CoFeSiB, CoFeB, CoZrTa, CoZrNb, and CoZrTaNb.

17. A method according to claim 8, wherein the SUL layers are formed from a material selected from the group consisting of FeCoTaZr, FeCoB, FeCoBCr, FeCoTaB, FeCoTa, and FeCoTaCr.

18. A method of forming a soft underlayer (SUL) structure for magnetic media, comprising:
  (a) providing the SUL structure with first and second soft underlayers (SUL1 and SUL2, respectively), SUL1 and SUL2 each having a thickness of less than 15 nm, and a Ru layer having a thickness of up to about 0.7 nm therebetween;
  (b) applying a cathode field to the SUL structure;
  (c) reducing an anti-parallel exchange energy (Jex) of the SUL structure to provide the SUL structure with an anti-parallel exchange field (Hex) that is lower than the cathode field; and
  (d) providing relatively low magnetization layers only at the Ru layer to reduce Jex, and relatively high magnetization in the SUL layers, to provide the SUL structure with a high average magnetization and reduced Hex such that the cathode field is greater than the Hex.

19. A method according to claim 18, wherein SUL1 and SUL2 each have a thickness that is less than about 10 nm, and the Jex is reduced by increasing a thickness of the Ru layer.

20. A method according to claim 18, wherein the Jex is reduced by decreasing magnetization (Bs) of the SUL structure, the Bs is reduced from about 1.2 T to about 0.8 T, which reduces the Hex and Jex by a factor of about 2, and the SUL1 and SUL2 each have a thickness of less than about 8 nm.

21. A method according to claim 18, wherein the cathode field is greater than the Hex by about 20 Oe, when magnetization of the SUL is about 1.2 T.

22. A method according to claim 18, wherein each of the relatively low magnetization layers is in a range of 0.3 to 0.8 T and located at the Ru layer, and the SUL layers have high magnetization in a range of 1.0 to 2.4 T.

* * * * *